(12) United States Patent
Chen et al.

(10) Patent No.: US 6,798,929 B2
(45) Date of Patent: Sep. 28, 2004

(54) PIEZOELECTRIC TUNABLE FILTER

(75) Inventors: Ga-Lane Chen, Fremont, CA (US); Charles Leu, Fremont, CA (US); Shu Lin Tai, San Jose, CA (US)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 2 days.

(21) Appl. No.: 10/234,665

(22) Filed: Sep. 3, 2002

(65) Prior Publication Data

US 2004/0042699 A1 Mar. 4, 2004

(51) Int. Cl.[7] .............................. G02F 1/01; G02F 1/335; G02F 1/295
(52) U.S. Cl. ...................... 385/1; 385/7; 385/8; 385/2; 385/14; 385/37; 385/129; 385/130
(58) Field of Search ................................ 385/1, 2, 7, 8, 385/10, 14, 37, 129–132; 398/85

(56) References Cited

U.S. PATENT DOCUMENTS

| | | | | |
|---|---|---|---|---|
| 5,062,684 A | * | 11/1991 | Clayton et al. | 385/27 |
| 6,363,089 B1 | * | 3/2002 | Fernald et al. | 372/20 |
| 6,507,693 B2 | * | 1/2003 | Maron et al. | 385/139 |
| 6,535,665 B1 | * | 3/2003 | Kim et al. | 385/28 |
| 6,597,711 B2 | * | 7/2003 | Fernald et al. | 372/20 |
| 6,650,810 B1 | * | 11/2003 | Lieberman et al. | 385/37 |

* cited by examiner

Primary Examiner—Brian Healy
Assistant Examiner—Kevin S. Wood
(74) Attorney, Agent, or Firm—Wei Te Chung

(57) ABSTRACT

A piezoelectric tunable filter (10) includes a ring (12) made of piezoelectric material surrounding a thin film waveguide (14), and an actuator (17) surrounding the ring. The actuator generates acoustic waves which apply external radial forces on the ring. Because the ring has piezoelectric properties, a periodic, high frequency piezoelectric signal can be generated by the ring and input to the waveguide to produce lattice vibration of the waveguide. The vibration can generate a fluctuating pattern of refractive index in the thin film waveguide due to the modulating effect of the signal. Thus, a periodic radial force of a predetermined frequency produces a desired vibration of the thin films of the waveguide, which in turn produces a desired refractive index in each film, which accordingly changes an optical thickness of each film. Thus, a desired optical wavelength equal to a combined optical thickness of two optically adjacent high refractive index films or two optically adjacent low refractive index films of the waveguide can be selected to pass through the waveguide.

19 Claims, 3 Drawing Sheets

PIEZOELECTRIC TUNABLE FILTER

BACKGROUND OF THE INVENTION

1. Field of the Invention

The present invention relates to tunable filters used in telecommunications applications such as Dense Wavelength Division Multiplexing (DWDM), and more particularly to piezoelectric tunable filters.

2. Description of the Prior Art

DWDM is an essential technology to meet the growing need for increased communications system capacity. Current DWDM technology requires at least one filter for one DWDM channel. Each channel includes one filter, one multi-fiber collimator and one single-fiber collimator. Therefore, the more channels there are, the more filters are required. Thus conventional DWDM systems are very expensive and bulky. In addition, mechanical and optical reliability is limited due to there being a great many three-port devices in the system.

A tunable filter can be provided to resolve the above-mentioned problems. The tunable filter can selectively add or drop particular wavelength channels from a multi-wavelength network. Tuning mechanisms used include thermo-optic, electro-optic, and piezoelectric mechanisms.

Arrayed Waveguide Grating (AWG) technology is based on a thermo-optic mechanism. However, AWG systems are not directly tunable, and have high loss and slow tuning speed.

A Mach-Zehnder Interferometer typically uses electro-optic actuation. However, manufacturing of such interferometer is very complicated because four reflecting surfaces thereof need to be parallel.

A piezoelectric tunable Fabry-Perot filter is described in J. Stone and L. W. Stulz, "Pigtailed High-Finesse Tunable Fibre Fabry-Perot Interferometers With Large, Medium and Small Free Spectral Ranges" Elect. Lett., Vol. 23, pp. 781–783 (Jul. 16, 1987). This article describes three Fabry-Perot filter prototypes and their test results. All three designs use standard lead zirconate titanate (PZT) piezoelectric components for tuning. These filters yielded finesse values up to 200. Furthermore, an insertion loss as low as 1.5 dB is observed for lower finesse values. These mechanically tunable filters have excellent wavelength selectivity and low insertion loss. Since they are mechanically tuned, however, they can only attain tuning speeds in the order of milliseconds.

A tunable optical filter is disclosed in U.S. Pat. No. 5,062,684, the disclosure of which is incorporated herein by reference. Referring to FIG. 3, a tunable optical filter 20 comprises two spaced ferrules 24 that are aligned along a common axis 28 and symmetrically oppose each other. Each ferrule 24 has an inmost end face 34, and a wafer 30 attached by adhesive material 31 to the end face 34. The wafer 30 has an inmost end face 38. A mirror 40 comprising alternating layers of material, at least one of which is a dielectric material, is embedded between the end face 34 and the wafer 30. An optical fiber 29 is disposed in a passageway 26 that is defined through the ferrule 24 and the wafer 30 along the axis 28. The two ferrules 24 are mounted in a support 42. The support 42 allows the ferrules 24 to be movable with respect to each other in directions along the axis 28. The movement may be accomplished by use of a piezoelectric transducer system 44. By applying a voltage across the transducer system 44, a distance between the opposing end faces 38 of the wafers 30 can be changed. The higher the applied voltage, the greater the distance between the end faces 38. However, when the distance is changed, it is difficult to maintain accurate alignment between the optical fibers 29. This often causes high insertion loss.

Hence, a fast tunable filter that overcomes the above-mentioned problems is desired.

SUMMARY OF THE INVENTION

Accordingly, it is an object of the present invention to provide a tunable filter which can tune a wavelength of a desired channel and which has the capability to manage multiple wavelengths for different channels.

In order to achieve the above object, a piezoelectric tunable filter of the present invention comprises a thin film waveguide, a ring made of piezoelectric material surrounding the thin film waveguide, and an actuator surrounding the ring. The actuator generates acoustic waves that apply an external radial force on the ring. Because the ring has piezoelectric properties, a periodic, high frequency piezoelectric signal can be generated by the action of the acoustic wave. The piezoelectric signal can be input to the thin film waveguide, and produce lattice vibration of the thin film waveguide. The lattice vibration can generate a fluctuating pattern of refractive index in the thin film waveguide due to the modulating effect of the piezoelectric signal. That is, a predetermined radial force on the ring produces a desired vibration of the thin films of the thin film waveguide. Such vibration of the thin films of the thin film waveguide produces a desired refractive index in each thin film. An optical thickness of each thin film of the thin film waveguide is changed accordingly. Thus, a desired optical wavelength equal to the combined optical thickness of two optically adjacent high refractive index thin films or two optically adjacent low refractive index thin films of the thin film waveguide can be selected to pass through the thin film waveguide.

Other objects, novel features and advantages of the present invention will be more readily understood from the following detailed description of a specific embodiment thereof when read in conjunction with the accompanying drawings, in which:

DETAILED DESCRIPTION OF PREFERRED EMBODIMENT

Figure 1:
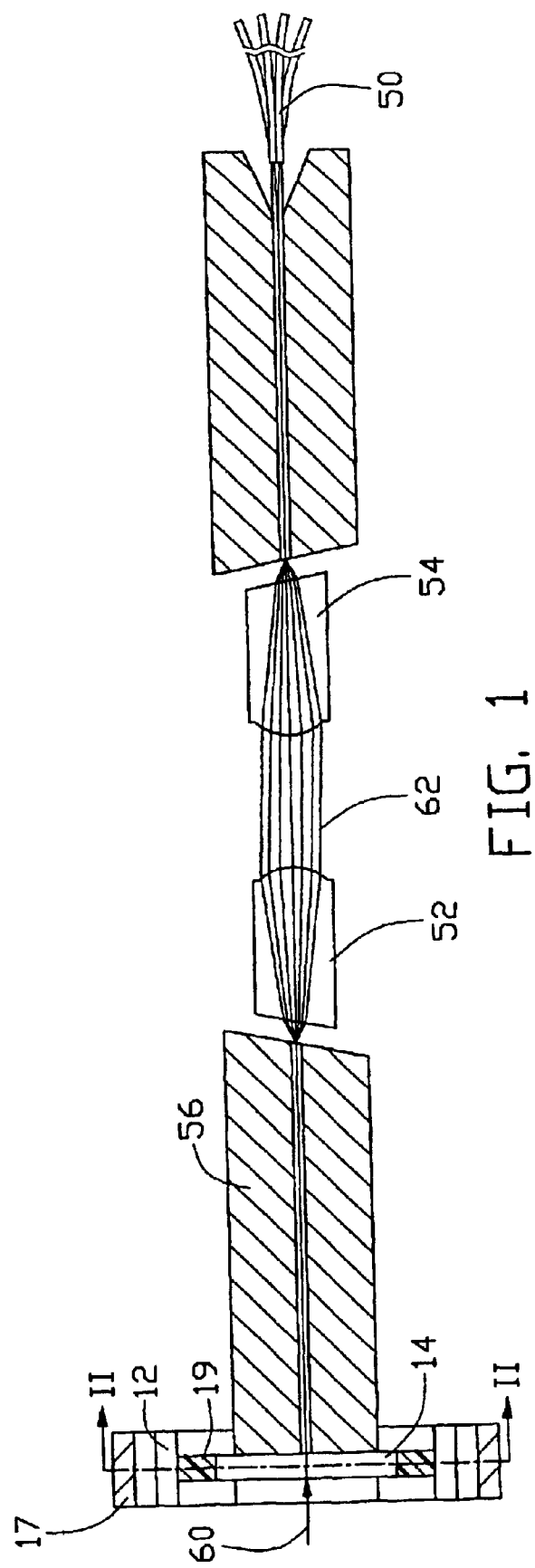
FIG. 1 is a schematic, cross-sectional view of an optical system incorporating a tunable filter in accordance with a preferred embodiment of the present invention, showing optical transmission paths in the optical system both before and after filtering out a desired wavelength from the input signal.

The present invention will be further described below with reference to the figures in which the same reference numerals are used to indicate the same elements.

Figure 2:
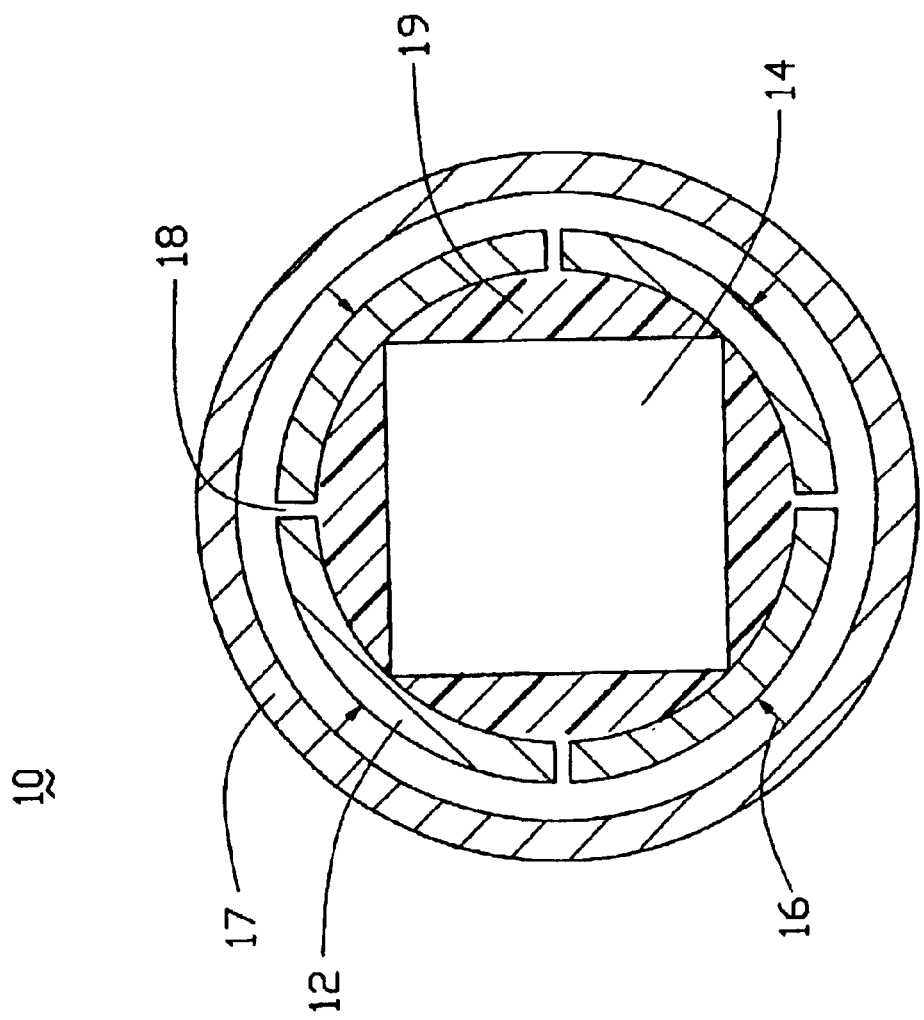
FIG. 2 is a schematic, cross-sectional view of the tunable filter of FIG. 1, taken along line II—II thereof.
Figure 3:
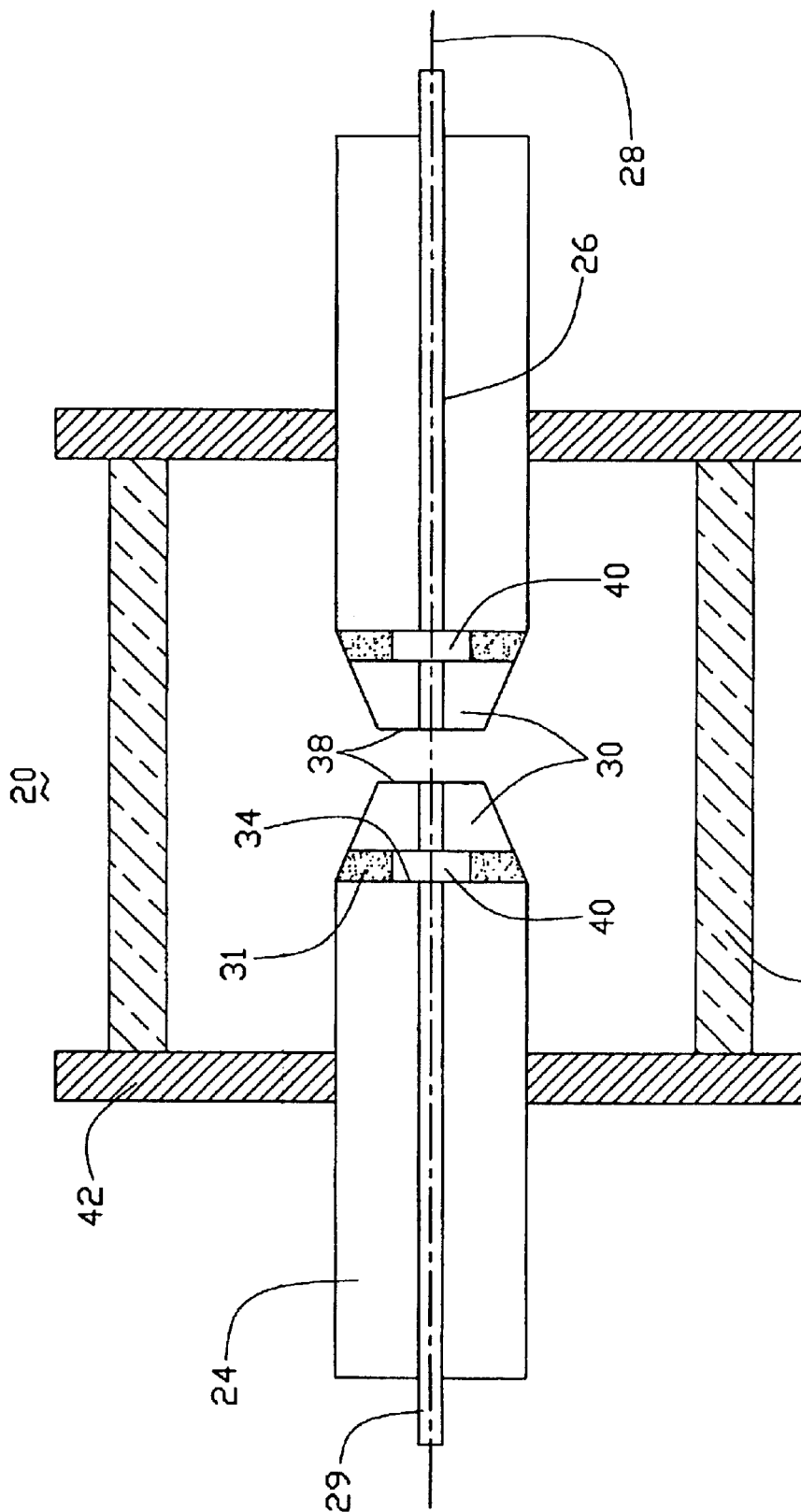
FIG. 3 is a schematic, cross-sectional view of a conventional tunable filter.

Referring to FIG. 2, a piezoelectric tunable filter 10 in accordance with the present invention comprises a thin film waveguide 14, a ring 12 surrounding the thin film waveguide 14, and an actuator 17 surrounding the ring 12.

The thin film waveguide 14 comprises a substrate and a multiplicity of thin films deposited on the substrate. The substrate comprises piezoelectric material such as Lithium Niobate (LiNbO$_3$), Lithium Tantalate (LiTaO$_3$), and Zinc Oxide (ZnO). The thin film waveguide 14 can be formed using known semiconductor manufacturing processes such as vapor deposition, ion implantation or molecular beam epitaxy. A refractive index of each thin film of the thin film waveguide 14 can be changed by piezoelectric means. In the present invention, the thin film waveguide 14 may typically be an Arrayed Waveguide Grating (AWG) or a Planar Lightwave Circuit (PLC). The AWG and PLC can each be constructed by patterning thin films deposited on a substrate, thereby forming the necessary thin film waveguide 14.

The ring 12 comprises a plurality of evenly spaced curved portions. Each two adjacent curved portions are separated by a gap 18. The gaps 18 allow the curved portions to be radially pressed toward a middle of the thin film waveguide 14. The ring 12 is bonded to the thin film waveguide 14 using epoxy 19 or an equivalent adhesive material. The epoxy 19 is preferably thermally-cured epoxy. The ring 12 is made of piezoelectric material such as Lithium Niobate (LiNbO$_3$) or Yttrium Vanadate (YVO$_4$), both of which are optical crystals with piezoelectric properties. Piezoelectricity provides coupling between a material's mechanical and electrical behavior. In the simplest of terms, when a piezoelectric material is mechanically squeezed, electric charge collects on its surface. Conversely, when a piezoelectric material is subjected to a voltage differential, it mechanically deforms. The curved portions of the ring 12 can be mechanically pressed inwardly, toward the thin film waveguide 14, by an external radial force 16 originating from the actuator 17. The external radial force 16 may typically comprise acoustic wave energy or other suitable energy provided by the actuator 17.

In the preferred embodiment, the actuator 17 is spaced from the ring 12, and this space between the ring 12 and the actuator 17 is an airspace (not labeled). An interdigital transducer (IDT) can serve as the actuator 17. The IDT is a piezoelectric crystal that converts input electrical energy into mechanical movement. A radio frequency (RF) signal is applied to the IDT. The IDT is excited by the RF signal, and the RF signal is converted into mechanical movement of the IDT. The mechanical movement induces one or more acoustic waves of desired varying wavelengths in the airspace. The acoustic waves provide the radial force 16 that acts on the ring 12. The radial force 16 presses the ring 12 inwardly. Because the ring 12 has piezoelectric properties, a periodic, high frequency piezoelectric signal can be generated. The piezoelectric signal can be transferred to the thin film waveguide 14 to produce a lattice vibration in the thin film waveguide 14. The lattice vibration can then generate a fluctuating pattern of refractive index in the thin film waveguide 14 due to the modulating effect of the piezoelectric signal on the lattice. Thus, a periodic radial force 16 of a desired frequency produces a desired vibration of the thin films of the thin film waveguide 14. This vibration of the thin films of the thin film waveguide 14 produces a desired refractive index in each thin film. An optical thickness of each thin film of the thin film waveguide 14 is changed accordingly. Thus, a desired optical wavelength equal to the combined optical thickness of two optically adjacent high refractive index thin films or two optically adjacent low refractive index thin films of the thin film waveguide 14 can be selected to pass through the thin film waveguide 14.

The center wavelength (CWL) of the tunable filter 10 can be tuned to a required value corresponding to a desired combined optical thickness of two optically adjacent high refractive index thin films or two optically adjacent low refractive index thin films of the thin film waveguide 14 according to the International Telecommunications Union (ITU) Grid. The CWL can provide sub-nano channel spacing. It can be tuned to 0.8 nanometer channel spacing for a 100 GHz DWDM system, and 0.4 nanometer channel spacing for a 50 GHz DWDM system.

FIG. 1 shows optical transmission paths in an optical system (not labeled) after filtering out a desired wavelength from incident light beams 60. Incident light beams 60 having different wavelengths and originating from the same or different input channels are transmitted into the tunable filter 10. By operation of the tunable filter 10 as described above, light beams 62 whose wavelengths are equal to the combined optical thickness of two optically adjacent high refractive index thin films or two optically adjacent low refractive index thin films of the thin film waveguide 14 can be selected to pass through a standard waveguide 56. In contrast, other light beams of the incident light beams 60 whose wavelengths are not equal to the said optical thickness cannot pass through the thin film waveguide 14. The light beams 62 then pass through a first collimating lens 52 to be collimated into parallel light beams 62. The parallel light beams 62 pass through a second collimating lens 54 to be focused directly into an entry face of a predetermined output channel 50.

The tunable filter 10 of the present invention can be rapidly tuned to the wavelength of a desired output channel, and has the capability to manage multiple wavelengths for various different channels. Therefore, a DWDM system incorporating the tunable filter 10 can be easily made on a miniaturized scale.

From the foregoing description, one skilled in the art can easily ascertain the essential characteristics of the present invention, and can make various changes and modifications to the present invention to adapt it to various usages and conditions but without departing from the spirit and scope of the present invention.

What we claim is:

1. A piezoelectric tunable filter, comprising:
   a thin film waveguide;
   a piezoelectric member substantially surrounding the thin film waveguide; and
   an actuator;
   wherein, when the actuator induces radial force on the piezoelectric member, the piezoelectric member generates a periodic, piezoelectric signal that changes refractive indexes of the thin film waveguide.

2. The piezoelectric tunable filter according to claim 1, wherein the thin film waveguide comprises a substrate and a plurality of thin films arranged on the substrate.

3. The piezoelectric tunable filter according to claim 2, wherein the thin film waveguide is an Arrayed Waveguide Grating or a Planar Lightwave Circuit, either of which is constructed by patterning thin films deposited on the substrate to form waveguides.

4. The piezoelectric tunable filter according to claim 1, wherein the piezoelectric member comprises Lithium Niobate or Yttrium Vanadate.

5. The piezoelectric tunable filter according to claim 1, wherein the piezoelectric member is a ring.

6. The piezoelectric tunable filter according to claim 5, where the ring defines at least one gap therein.

7. The piezoelectric tunable filter according to claim 1, wherein the piezoelectric member is bonded to the thin film waveguide using epoxy or equivalent adhesive material.

8. The piezoelectric tunable filter according to claim 1, wherein the actuator comprises piezoelectric material.

9. The piezoelectric tunable filter according to claim 8, wherein the actuator is an interdigital transducer.

10. An optical system comprising:
    a tunable filter comprising:
        a thin film waveguide;
        a piezoelectric member surrounding the thin film waveguide; and
        an actuator; and
    output means arranged adjacent the tunable filter,
    wherein when the actuator induces radial force on the piezoelectric member, the piezoelectric member generates a periodic, piezoelectric signal that changes refractive indexes of the thin film waveguide, whereby a desired wavelength can be selected from a light beam incident on the tunable filter and output to the output means.

11. The optical system according to claim 10, wherein the optical system is a Dense Wavelength Division Multiplexing system.

12. The optical system according to claim 10, wherein the thin film waveguide is an Arrayed Waveguide Grating or a Planar Lightwave Circuit, either of which is constructed by patterning thin films deposited on a substrate to form waveguides.

13. The optical system according to claim 10, wherein the piezoelectric member comprises Lithium Niobate or Yttrium Vanadate.

14. The optical system according to claim 10, wherein the piezoelectric member is a ring defining at least one gap therein.

15. The optical system according to claim 10, wherein the actuator comprises piezoelectric material.

16. The optical system according to claim 15, wherein the actuator is an interdigital transducer.

17. The optical system according to claim 10, wherein the output means comprises a first collimating lens, a second collimating lens, and at least one output channel.

18. A method of tuning the filter, comprising steps of:
    providing a thin film waveguide;
    providing a piezoelectric member around said waveguide; and
    applying a force upon said piezoelectric member to generate high frequency piezoelectric signals thereof, thus further generating lattice vibration resulting in a fluctuating pattern of a refractive index of each thin film.

19. The method as described in claim 18, wherein said force is generated by acoustic waves induced by a mechanical movement which results from RF signals imposed upon an interdigital transducer.

* * * * *